(12) United States Patent
Meyers

(10) Patent No.: US 7,496,947 B1
(45) Date of Patent: Feb. 24, 2009

(54) CACHE DEVICE AND METHOD FOR GENERATING A VIRTUAL RADIO OR TELEVISION BROADCAST

(75) Inventor: Stephan Meyers, Tampere (FI)

(73) Assignee: Nokia Corporation, Epsoo (FI)

( * ) Notice: Subject to any disclaimer, the term of this patent is extended or adjusted under 35 U.S.C. 154(b) by 0 days.

(21) Appl. No.: 09/513,964

(22) Filed: Feb. 28, 2000

(51) Int. Cl.
*H04N 5/445* (2006.01)
*H04N 7/173* (2006.01)
*G06F 3/00* (2006.01)
*G06F 13/00* (2006.01)

(52) U.S. Cl. ............................ 725/97; 725/44; 725/87

(58) Field of Classification Search ............. 725/32–35, 725/68, 87, 100, 109, 133, 141, 153, 48, 725/46; 700/93–94; 370/352; 455/550, 455/556, 564
See application file for complete search history.

(56) References Cited

U.S. PATENT DOCUMENTS

| | | | |
|---|---|---|---|
| 5,351,075 A * | 9/1994 | Herz et al. ..................... 725/13 |
| 5,410,344 A | 4/1995 | Graves et al. .................. 348/1 |
| 5,790,426 A | 8/1998 | Robinson ..................... 364/554 |
| 5,794,127 A | 8/1998 | Lansang ....................... 455/66 |
| 5,912,696 A | 6/1999 | Buehl .......................... 348/5.5 |
| 5,945,987 A | 8/1999 | Dunn .......................... 345/327 |
| 6,016,475 A | 1/2000 | Miller et al. ................... 705/1 |
| 6,167,251 A * | 12/2000 | Segal et al. ................. 455/406 |
| 6,167,253 A * | 12/2000 | Farris et al. ............... 455/412.2 |
| 6,188,398 B1 * | 2/2001 | Collins-Rector et al. ...... 725/37 |
| 6,192,340 B1 * | 2/2001 | Abecassis .................... 704/270 |
| 6,199,076 B1 * | 3/2001 | Logan et al. ............. 715/501.1 |
| 6,202,062 B1 * | 3/2001 | Cameron et al. ............... 707/3 |
| 6,208,335 B1 | 3/2001 | Gordon et al. .............. 345/327 |
| 6,314,094 B1 * | 11/2001 | Boys .......................... 370/352 |
| 6,356,971 B1 * | 3/2002 | Katz et al. ................... 710/301 |
| 6,470,378 B1 * | 10/2002 | Tracton et al. .............. 709/203 |
| 6,650,902 B1 * | 11/2003 | Richton ................... 455/456.3 |

FOREIGN PATENT DOCUMENTS

| | | |
|---|---|---|
| EP | 0 854 654 A2 | 7/1998 |
| JP | 09251296 | 9/1997 |

(Continued)

OTHER PUBLICATIONS

MusicMatch Jukebox Audiosoftware, http://www.musicmatch.com/info/company/press/releases/?year1998&release=2, May 18, 1998.*

(Continued)

*Primary Examiner*—Hunter B. Lonsberry
(74) *Attorney, Agent, or Firm*—Hollingsworth & Funk, LLC

(57) ABSTRACT

Method for generating a virtual radio or television broadcast by downloading data, including content, information, and advertising, in any order from a Web site on the Internet. The data is downloaded to a device that is preferably portable, such an MP3 player or a mobile phone, and can be connected intermittently to the Internet over a wireless connection. Software loaded on the device uses an algorithm, specified by a user or otherwise, to organize the downloaded data into a particular order, such as into a conventional radio or television-style broadcast format. User data and preferences can also be uploaded to the Web site to influence the type of data that is downloaded. A virtual periodically-updated newscast can be similarly generated.

51 Claims, 4 Drawing Sheets

FOREIGN PATENT DOCUMENTS

| | | |
|---|---|---|
| JP | 10260955 | 9/1998 |
| JP | 10-312468 | 11/1998 |
| JP | 10301946 | 11/1998 |
| JP | 11-032070 | 2/1999 |
| JP | 11-242686 | 9/1999 |
| JP | 2000-023062 | 1/2000 |
| WO | WO 83/03181 | 9/1983 |
| WO | WO 99/35830 | 7/1999 |

OTHER PUBLICATIONS

Official Action including Notification of Reason for Rejection Nov. 19, 2004 issued in corresponding Japanese Patent Application 2001-106473.

U. Shardanand, et al.; Social Information Filtering: Algorithms for Automating "Word fo Mouth"; MIT Media—Lab 1995.

Translation of Japanese Office Action dated Jul. 4, 2006 issued in corresponding Patent application No. 2001-106473.

* cited by examiner

CACHE DEVICE AND METHOD FOR GENERATING A VIRTUAL RADIO OR TELEVISION BROADCAST

BACKGROUND OF THE INVENTION

1. Field of the Invention

This invention relates to the generation of an individually-targeted virtual radio or television broadcast.

2. Description of the Related Art

Users of the Internet may listen to and/or view multimedia content available on the Internet, but must either play or download to a digital audio player the individual items of content, such as a video or song, which must be specifically selected. Forcing the user to select the specific videos and songs for download eliminates the excitement and surprise of a seamless broadcast where one can experience a mix of not only videos and songs but also other information such as traffic, weather, and DJ introductions to songs, and where one may also be exposed to new music. An Internet user can alternatively listen to programmed channels of entertainment and information broadcast over the Internet, but those broadcasts, as in radio and television broadcasts target large audiences and are not responsive to the specific needs and desires of each individual listener.

Advertisers on radio and television target certain demographic audiences who they believe are potential or actual consumers for their products based on the content of the broadcast. However, none of the broadcast media are able to customize the broadcast and advertising by individual rather than groups, primarily due to limitations of the various forms of media. Existing radio and television broadcasts simply do not permit customization of content or advertising. Moreover, they only operate when the receiver is able to receive the signal and their sphere of influence is generally local, rather than international, although networks of stations may broadcast the same content. On the Internet, advertisers currently target the users of particular Web sites rather than a particular individual. It would be advantageous if advertisers could target advertising to an individual directly during a broadcast rather than trying to reach these individuals via a "canned" broadcast that may or may not reach the appropriate consumer.

SUMMARY OF THE INVENTION

It is an object of this invention to provide a method for generating an individually-targeted broadcast from data comprising audio and/or visual content and other information intermittently downloaded to a device where the content can be automatically organized and formatted into the individually-targeted broadcast.

It is a further object of this invention to provide a method for generating an individually-targeted broadcast where the downloaded content is interspersed with recorded or synthesized speech for introductions to the content and with advertising.

Accordingly, a method for generating a virtual broadcast is practiced on a device, which may be generically referred to as a "virtual broadcast device", that is connected, usually only periodically, to the Internet. One such virtual broadcast device is a mobile phone that offers wireless Internet connectivity. During an Internet session, a user visits a Web site containing content and other information suitable for inclusion in the virtual broadcast and downloads selected audio and/or video content (such as music or videos) and other information (e.g., DJ introductions to the music, traffic, news, weather) to the device in any order. Advertising may also be downloaded. The type of content and other information downloaded, such as the style of music, can be selected by the operator of the Web site or by the user based on user preferences. The data is organized on the virtual broadcast device into the virtual broadcast according to a selected algorithm resident on the virtual broadcast device. The virtual broadcast may then be played on the virtual broadcast device, if provided with play capabilities, or on another player device. Particular selections in the virtual broadcast may be marked as favorites for more frequent play or marked for deletion. User rankings or ratings of selections in the virtual broadcast may be uploaded to the Web site to influence future downloads of content for inclusion in the virtual broadcast.

In accordance with a first aspect of the invention, a virtual radio broadcast is created comprising songs introduced by disk jockeys and interspersed with advertising, and reports on traffic, stocks, etc. Particular selections in the virtual broadcast may be marked as favorites for more frequent play or marked for deletion. User rankings or ratings of selections in the virtual broadcast may be uploaded to the Web site to influence future downloads of content for inclusion in the virtual broadcast.

In accordance with a second aspect of the invention, a virtual television news broadcast is generated by downloading news stories and other information from a Web site and organizing the news stories and other information into a broadcast format. By periodically connecting to the Internet after the initial download, one or more additional news stories may be downloaded from the Web site and incorporated into the virtual broadcast in order to keep the broadcast current. Older news stories may likewise be dropped from the broadcast.

According to either aspect of the invention, rather than connecting to a Web site to download data containing content, other information, and advertising, the data may be captured from a subsignal broadcast from a conventional broadcast device, such as a radio or television transmitter. The user may then provide user information, such as rankings or ratings, to the source of the subsignal, either by a later Internet connection or other means, to influence the broadcast data.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the several views.

DETAILED DESCRIPTION OF THE PRESENTLY PREFERRED EMBODIMENTS

Figure 1A:
FIG. 1(a) is a block diagram illustrating one method for transferring data to a device for practicing the invention.
Figure 2:
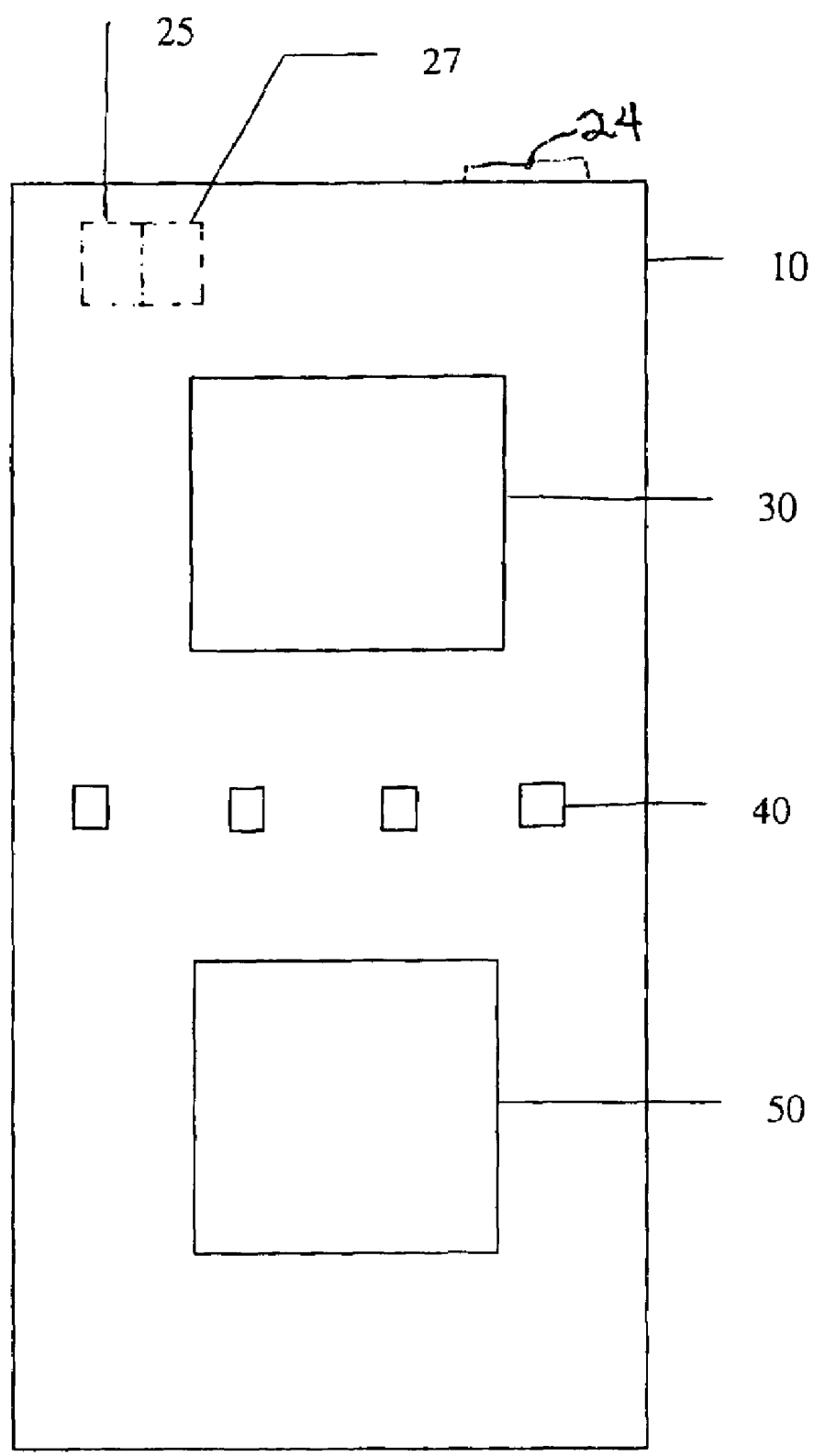
FIG. 2 is a plan view of one device which may be used for practicing the invention.

Referring to FIGS. 1(a) and 2, a device 10 utilizing the present invention creates a virtual broadcast using data files containing content and various other information for the broadcast downloaded from a Web site (or multiple Web sites) on the Internet (World Wide Web (WWW)) 20. Device 10 is preferably a portable device which is handheld, mounted in a car, integrated into a mobile phone, or is otherwise portable, and has a digital audio player with a high capacity storage device. The device 10 has a port 24 over which the data is downloaded, a memory 25 in which the downloaded data is stored, a processor 27 for processing the downloaded data into the virtual broadcast, a display 30 where various information, such as song titles and artists or menu selections, can be displayed, and buttons 40 for selecting functions, the buttons being either dedicated to a particular function such as play, skip, repeat, move forward or backward, etc. or serving different functions depending on the menu displayed on display 20. An MP3 player with a large capacity hard disk and appropriate software would be one suitable device, but the invention is in no way limited to being practiced on an MP3 player. (Where device 10 is an MP3 player, the MP3 player may require the replacement of the ROM to install enhanced software with the capabilities described below.) Another suitable device for device 10 would be a PC with a modem but it would lack the advantages of a portable device, unless it were a lightweight laptop computer. To view a virtual television broadcast, device 10 may have a separate video screen 50, which is unnecessary for users desiring audio broadcasts only or where screen 30 is of a screen type suitable for viewing videos.

Figure 1B:
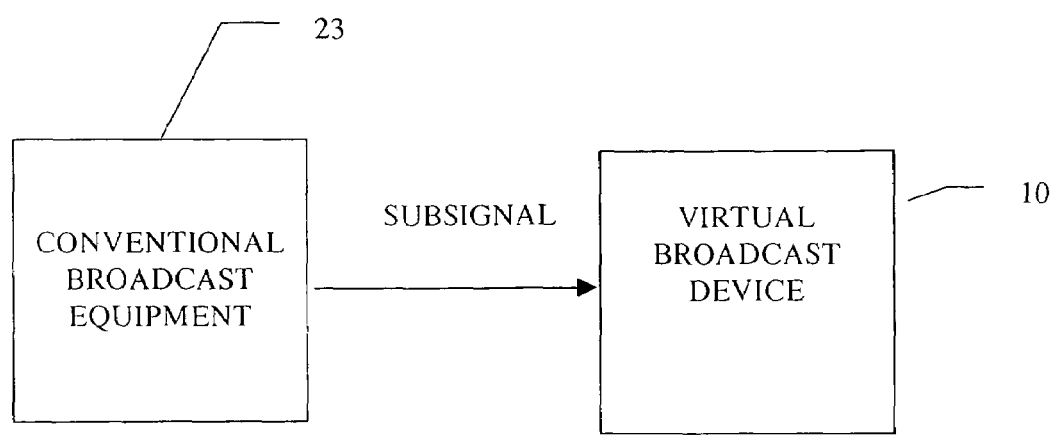
FIG. 1(b) is a block diagram illustrating a second method for transferring data to a device for practicing the invention.
Figure 3:
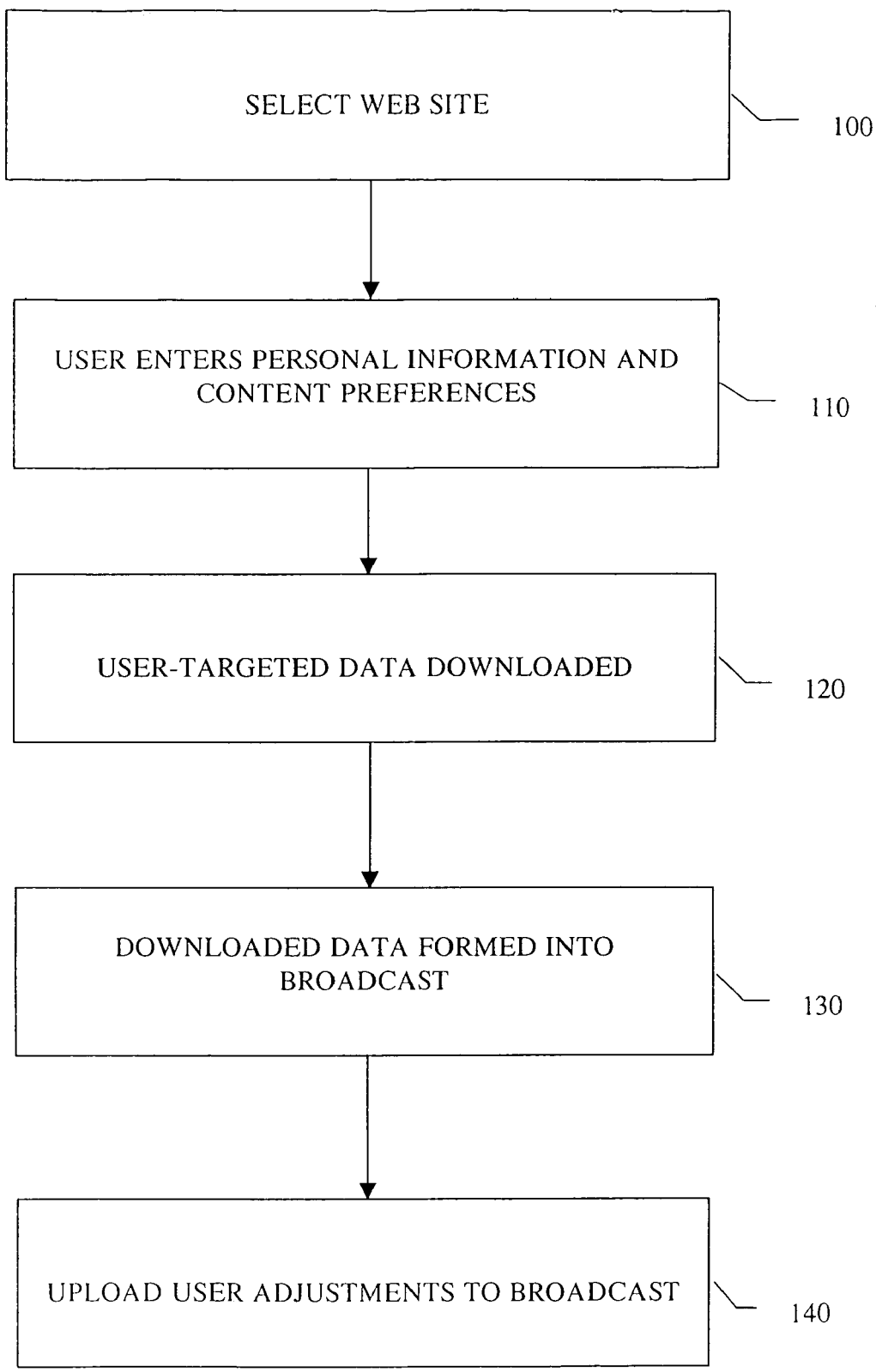
FIG. 3 is a flow chart of the algorithm for downloading content and forming the broadcast according to a first aspect of the invention.

The connection between device 10 and the Internet 20 may be either wired or wireless and either constant or intermittent. Where the Internet connection is wireless, the files may be downloaded gradually, a little at a time, at cheaper, bulk bandwidth rates. Or, rather than using the Internet to download the files, the files may be transmitted over a digital subsignal of a conventional broadcast, such as transmitting digital music and other information on a digital subsignal of a conventional AM or FM radio broadcast or transmitting videos and other information over a subsignal of a conventional television broadcast (FIG. 1(b)) and captured by an antenna (not shown) on device 10.

Where files are downloaded from the Internet, the data to be used in the virtual broadcast is loaded onto device 10 as follows: Referring to FIG. 3, at step 100, a first-time user goes to a Web site where data files containing digital audio and/or visual "content", such as music, videos, news stories, or similar items which form the substance of a conventional radio or television broadcast, are available. At step 110, the user enters user information, which may include registration information required for membership on the Web site (such as payment information if the Web site is not free), and selects a format recognized by the user's virtual broadcast device in which to download the information. The user may also select the available optional user preferences as to what type of content is desired, e.g. classical or pop music, songs from a particular decade, etc., or the content type may be selected by the Web site server. For example, the Top 40 songs may be selected for download. As yet another option, the user may not need to specify any preferences, instead having device 10 maintain an internal ranking of the user's preferences which can be communicated via a control on device 10. The Web site would then select the content of the virtual broadcast based on the specified criteria.

At step 120, one or more files containing content of the type preferred by the user or selected by the Web site are downloaded into memory 25 in a format that is compatible with device 10 and are preferably encrypted to prevent illegal copying. A record may be kept of the downloaded content in order to pay any required royalties. Also downloaded at step 120 is "information" other than content, including information about the downloaded content, that may optionally be integrated and interspersed into the virtual broadcast, as described below, between various items of content to enhance the user enjoyment of the virtual broadcast. The information about the content may include DJ (disk jockey) introductions for each song in a virtual radio broadcast or VJ (video jockey) introductions for each video in a virtual television broadcast. The DJ introductions could be prerecorded by an announcer or created using synthesized speech. The information may also include weather reports, the time, stock quotes, and traffic reports. For example, weather reports interspersed into the broadcast at certain intervals could be created using phrases such as "Sunny" or "Partly cloudy". The effect of a live broadcast may be best simulated where all of the information, including song introductions, weather reports, etc. is prerecorded in the same DJ's voice. More than one announcer could prerecord the same introduction so a user could choose from a selection of different DJ voices.

A rating system that cross-correlates the preferences of different users is provided by the server. This rating system looks for patterns in the musical preferences of different users and suggests to the user music that he might like, based on the preferences of users with similar profiles.

Advertisements (appropriate to the particular media, audio for a virtual radio broadcast and video for a virtual television broadcast) may also be downloaded at step 120 along with the content and other information to be integrated and interspersed within the virtual broadcast in order to subsidize the operating expenses of the Web site and to defray the cost of royalties the Web site operator must pay to copyright owners. These advertisements can be individually targeted based on user information that is supplied at step 110. The user information can then be used along with the selection of content-preferences to select individually-target advertisements for download along with the content. The user may be permitted to specifically select the type of advertising downloaded. The content, information, and advertising need not be downloaded in any particular order because the broadcast is organized by software loaded on device 10.

At step 130, once the files are downloaded from the Web site, software in device 10 organizes the mix of downloaded content, information and advertising into a virtual broadcast according to an algorithm which may be selected by a user or some other means. This organizing of a virtual broadcast may be referred to as "generative broadcasting." For example, where audio is downloaded, the virtual broadcast has the format of a customized radio broadcast. As in a conventional radio broadcast, for example, a song may be introduced with a DJ introduction, the song is then played, and is followed by an advertisement, a weather report, and then another song may be introduced and played. Where there is a choice of DJ's, each available DJ may be associated with a different algorithm for deciding which item, such as a song, will be played will be next. The user may optionally choose not to include any DJ introductions in the virtual broadcast.

More sophisticated algorithms for organizing the virtual broadcast may be substituted. For example, algorithms for selecting content and advertising could be influenced by external triggers, such as the time of day (e.g., restaurant ads at lunch, faster music in the afternoon), motion (e.g., user movement could trigger music with a more prominent beat, car travel could trigger ads for new cars (car movement would be determined by any available means, such as by a Global Positioning System, GPS, cross-correlated with publicly-available maps)), localized low power radio transmitters (e.g., walking by a chain store triggers an ad for that chain store), or other factors. Urgent breaking news, such as a weather warning or a stock price alert, could be transmitted as a relatively small amount of raw data to device 10 from the Web site, if a connection can be established, and interrupt the broadcast as though the broadcast were live. By transmitting only a small amount of data, such as, for example, a possible 8 bytes for a stock quote, and by having a synthesized or prerecorded voice read the stock quote, as opposed to capturing a large amount of data required for a stock quote read by a live reporter and transmitted over a conventional radio broadcast, a high fidelity broadcast of urgent breaking news can be incorporated into the virtual broadcast even if poor quality network conditions only permit a limited data throughput. Certain dated information like the weather information can be discarded automatically after a period of time.

While the broadcast may just cut from segment to segment, complex transitioning techniques can be used to transition between segments of the broadcast such as fades, cross-cuts, wipes, etc. For example, one song may start before another one ends, or an advertisement could fade into a song or be played during the song. DJ algorithms could effect complex transitions between pieces of music for more effective mixing. Using even more sophisticated algorithms, software on device 10 can be programmed to generate the automated "mixing" of songs by processing multiple pieces of music at the same time and weaving those songs into a broadcast at device 10.

The user starts playing the broadcast by pressing a "play" button, included as one of buttons 40, and may repeat, skip, or move forward or backward in the broadcast, and may perform other functions for controlling the broadcast either with a dedicated button for that particular function or with the buttons provided in combination with menus on display 20.

During or after the original broadcast, the user can make adjustments to the broadcast to suit his preferences at step 140. In a radio broadcast, individual songs can be marked by the user for deletion, promoted to a "favorite song" status to play that song more often, or may be ranked by the user. The ranking influences the probability of playing a particular song. For example, the top ranked song might be played two or three times in one hour, while the $40^{th}$ ranked song might play only once a day. During the next connection between the device and the Web site, the user ranking is uploaded to the Web site, allowing the collection of demographic information about the listeners, both as individuals and collectively. During this same connection, if there is new content available, the lowest ranking songs can be deleted from the bottom of the list to be replaced with the new material. New advertising may be downloaded at that time as well. The marking of songs for deletion or promotion to "favorite song" status and the ranking of songs may be accomplished by displaying the names of the songs on screen 30 and buttons 40 can then be used to manipulate the songs as desired. Alternatively, certain buttons 40 could be designated to perform individual functions such as marking a favorite song or deleting a song while the song is playing.

The device 10 used to practice the invention, such as an MP3 player, may be used both for the broadcast of a virtual radio or television station to be maintained in a portion of the device and may be used at the same time to play individual items of content, such as songs, specifically selected for download by the user.

The invention offers many advantages over a traditional radio broadcast. It allows a user to receive a simulated broadcast which can be enjoyed passively without the user having to select the precise content. The user can optionally control the broadcast by, for example, rating individual songs, but need not exercise this control. It also provides the user with a virtual radio broadcast when a favorite radio station is unavailable, such as in an airplane (where a player that does not interfere with the aviation equipment and communications is required) or in a foreign city. The virtual broadcast is immune to radio interference since the data is digitally downloaded and processed for error correction before presentation to the user. The user can enjoy the content at a possibly reduced cost due to advertising. Logs of the user's listening history can also be uploaded at step 140 to provide accurate demographic information for these advertisers and can be used to determine a fair distribution of royalties on a precise basis, such as per song, or, more generally, per-item of content downloaded or played.

Figure 4:
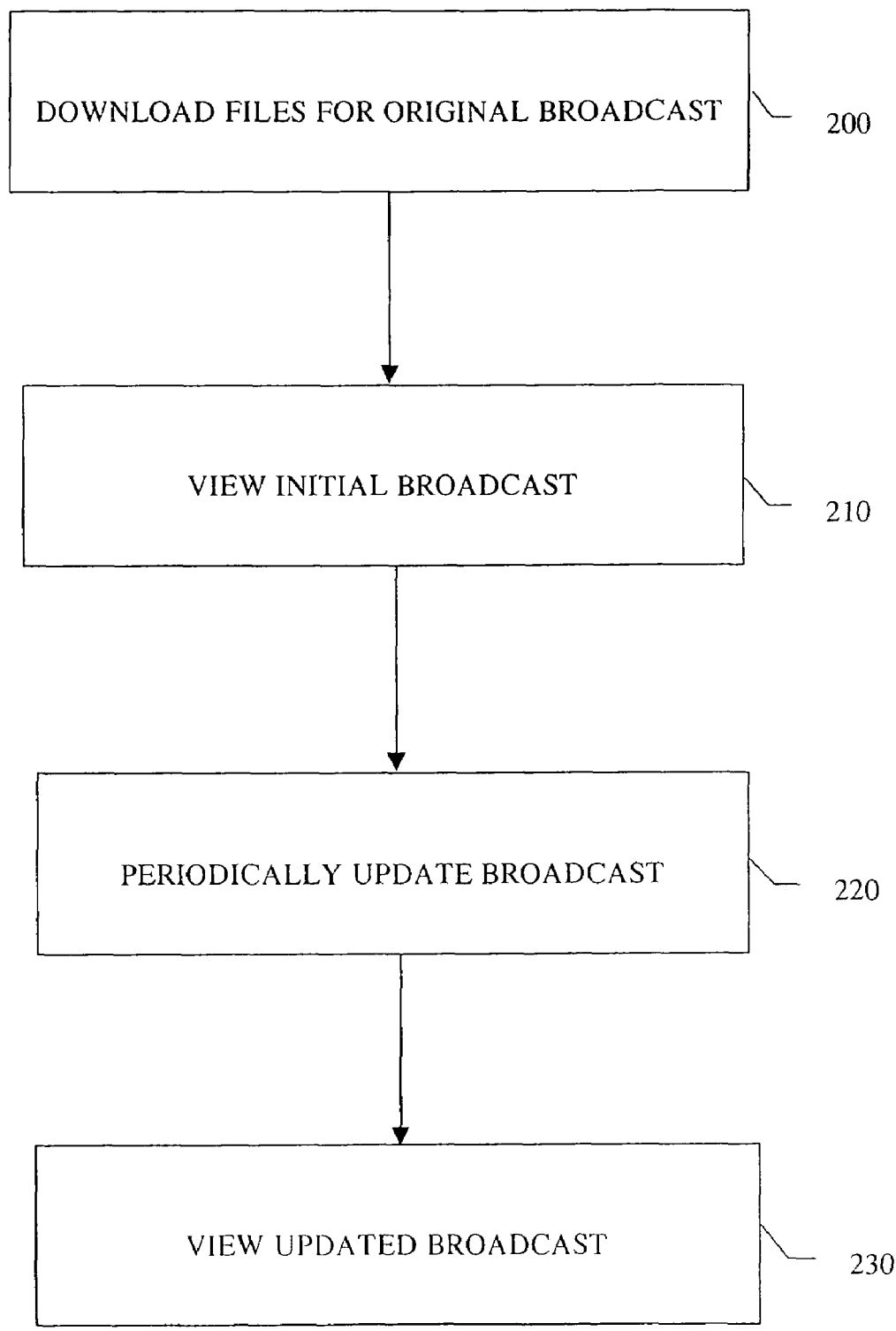
FIG. 4 is a flow chart of the algorithm according to a second aspect of the invention.

In another aspect of the present invention, one may generate a virtual television-style broadcast of continuously available news programming. In this implementation, illustrated in FIG. 4, files containing the latest news stories are downloaded initially from a Web site on the Internet 20 to device 10 at step 200 or are broadcast over a subsignal of a conventional television broadcast (not shown). Also downloaded are files containing "information" such as introductions to the news stories, weather reports, stock quotes, etc. and advertising. Software on device 10 then weaves the news stories, news story introductions and additional information into a virtual news broadcast or "newscast" using an algorithm programmed into device 10 for viewing, at step 210, on screen 50. In one such algorithm, each news story is preceded by the appropriate introduction and advertising is played after every few news stories. In addition, various items such as stock information, weather reports, and news headlines, may be streamed across separate areas of the screen 50. After the initial broadcast, at step 220, the future newscast may be periodically updated at regular intervals by deleting old news stories and obtaining updates to existing news stories or new news stories by download from the appropriate Web site or from the subsignal of the conventional television broadcast. Generally, these updates, if performed often enough, such as once every half-hour, which is particularly feasible with a wireless Internet connection, will only require incremental changes as compared to the content to be included in a broadcast and will therefore require only a small proportion of the bandwidth of a full-streaming Internet connection. At step 230, the revised virtual television-style news broadcast may be viewed on screen 50. To save time, the user could skip over stories that have already been viewed. Rather than implementing this embodiment on a portable device, it may be more appropriate to implement this embodiment on a device mounted in an airport or other location where repetitive newscasts are appropriate.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

I claim:

1. A method for generating a virtual broadcast on a virtual broadcast device, the method comprising:

connecting the virtual broadcast device to a Web site over a wireless connection, the virtual broadcast device being a mobile phone;

downloading and storing data comprising content and other information to be integrated into the virtual broadcast from the Web site to the virtual broadcast device in any order, the content comprising songs and the other information comprising at least one of introductions to the songs, advertisements, weather information, and news;

organizing the data on the virtual broadcast device into a particular order for the virtual broadcast according to a selected algorithm provided on the virtual broadcast device after all of the data for the virtual broadcast is downloaded from the Web site, whereby the virtual broadcast device is disconnectable from the Web site during said step of organizing;

presenting, by the virtual broadcast device, the virtual broadcast to the user;

applying a ranking, by a user using the virtual broadcast device, to at least one of the songs in the virtual broadcast while the at least one of the songs is being presented in said step of presenting, the user ranking influencing the probability of playing the at least one song in the virtual broadcast; and adjusting, by the virtual broadcast device, the virtual broadcast in accordance with the user ranking so that the number of times that at least one song is played within a predetermined time period is adjusted based on the user ranking.

2. The method of claim 1 further comprising selecting the data to be downloaded based on user preferences.

3. The method of claim 1 further comprising downloading advertising from the Web site and inserting the advertising into the virtual broadcast.

4. The method of claim 1 wherein the content is comprised of a plurality of items and the information comprises a plurality of introductions related to the items of content and said step of organizing the virtual broadcast comprises introducing each of the plurality of items of content with a related one of said introductions.

5. The method of claim 1 further comprising uploading from the virtual broadcast device to the Web site the user ranking of the selected song, and downloading additional content and additional other information to update the virtual broadcast on the basis of the user ranking.

6. A method for generating a virtual broadcast on a virtual broadcast device, the method comprising:

connecting the virtual broadcast device to a Web site over a wireless connection, the virtual broadcast device being a mobile phone;

capturing in the virtual broadcast device a signal generated by conventional broadcast means, the signal comprising content and other information to be integrated into the virtual broadcast and transmitted by the conventional broadcast means in any order, the content comprising songs and the other information comprising at least one of introductions to the songs, advertisements, weather information, and news;

organizing the captured content and other information on the virtual broadcast device into a particular order for the virtual broadcast according to a selected algorithm provided on the virtual broadcast device after all of the data for the virtual broadcast is captured, whereby the virtual broadcast device is disconnectable from the Web site and the conventional broadcast means during said step of organizing;

presenting, by the virtual broadcast device, the virtual broadcast to the user;

applying a ranking, by a user using the virtual broadcast device, to at least one of the songs in the virtual broadcast while the at least one of the songs is being presented in said step of presenting, the user ranking influencing the probability of playing the at least one song in the virtual broadcast; and adjusting, by the virtual broadcast device, the virtual broadcast in accordance with the user ranking so that the number of times that at least one song is played within a predetermined time period is adjusted based on the user ranking.

7. The method of claim 6 further comprising downloading advertising from the Web site and inserting the advertising into the virtual broadcast.

8. The method of claim 6 wherein the content is comprised of a plurality of songs, the information comprises DJ introductions to the songs and the virtual broadcast is a virtual radio broadcast.

9. A method for generating a virtual television broadcast on a virtual television broadcast device, the method comprising:

connecting the virtual television broadcast device to a Web site over a wireless connection, the virtual television broadcast device being a mobile phone;

downloading and storing files comprising a plurality of news stories and other information to be integrated in the virtual television broadcast from the Web site to the virtual television broadcast device in any order, the other information comprising at least one of introductions to the news stories, weather reports, stock quotes, and advertising;

organizing the stored content and other information on the virtual television broadcast device into a particular order for the virtual broadcast according to a selected algorithm provided on the virtual television broadcast device after all of the data for the virtual television broadcast is downloaded from the Web site, whereby the virtual television broadcast device is disconnectable from the Web site during said step of organizing;

periodically downloading an additional news story from the Web site; and generating an updated virtual television broadcast by incorporating the additional news story into the previously generated virtual television broadcast after all of the data for the additional news story is downloaded from the Web site.

10. The method of claim 9 wherein the virtual television broadcast and the revised television broadcast display both news and other information at the same time on different portions of a screen on the virtual television broadcast device.

11. A method for generating a virtual television broadcast on a virtual television broadcast device, the method comprising:

connecting the virtual television broadcast device to a Web site over a wireless connection, the virtual television broadcast device being a mobile phone;

capturing in the virtual television broadcast device a signal generated by a conventional broadcast means, the signal comprising video of a plurality of news stories and other information to be integrated into the virtual television broadcast and transmitted by the conventional broadcast means in any order, the other information comprising at least one of introductions to the news stories, weather reports, stock quotes, and advertising; and organizing the content and other information on the virtual television broadcast device into a particular order for the virtual broadcast according to a selected algorithm provided on the virtual television broadcast device after all of the data for the virtual television broadcast is downloaded from the Web site, whereby the virtual television broadcast device is disconnectable from the conventional broadcast means during said step of organizing;

periodically downloading an additional news story from the Web site and generating an updated virtual television broadcast by incorporating the additional news story into the previously generated virtual television broadcast.

12. The method of claim 11 wherein the virtual television broadcast and the revised television broadcast display both news and other information at the same time on different portions of a screen on the virtual television broadcast device.

13. A device for generating a virtual television broadcast, the device comprising:

a memory;

means for inputting data, comprising video of a plurality of news stories and other information to be integrated into the virtual television broadcast, to be stored in the memory, wherein the device is a mobile phone capable of making a wireless connection to the Internet for downloading the data, the content comprising songs and the other information comprising at least one of introductions to the songs, advertisements, weather information, and news;

means for organizing the data into the virtual broadcast comprising the news stories interspersed with the other information according to a specific algorithm provided on the device after all the data for the virtual broadcast is input to the memory, said device being disconnectable from the Internet while the means for organizing organizes the data; and means for periodically inputting an additional news story and generating an updated virtual television broadcast by including the additional news story into the previously generated virtual television broadcast.

14. The method of claim 1 wherein the data to be downloaded and stored from the Web site is selected by the operator of the Web site based on user preferences.

15. The method of claim 1 wherein the data to be downloaded and stored from the Web site is selected by the user.

16. The method of claim 1 further comprising the step of playing the virtual broadcast on a player device other than the virtual broadcast device.

17. The method of claim 1 further comprising the step of entering, by the user, user information including registration information required by the Web site after said step of connecting.

18. The method of claim 17 wherein said step of entering further comprises entering a selection of a format recognizable by the virtual broadcast device in which to download information.

19. The method of claim 1 further comprising the step of communicating user preferences to the Web site using a control on the virtual broadcast device, which maintains the user preferences on the virtual broadcast device.

20. The method of claim 1 wherein the other information includes speech which is recorded in one or more voices including recorded human voices and synthesized speech, the voice to be downloaded being selected by the user.

21. The method of claim 3 wherein the downloading of advertising is based on user preferences.

22. The method of claim 1 wherein the algorithm for organizing the data is responsive to external triggers.

23. The method of claim 22 wherein the external triggers include one of the time of day, motion, and localized low power radio transmitters.

24. The method of claim 1 further comprising the steps of establishing a connection between a Web site and the virtual broadcast device for transmitting urgent breaking news as a small amount of data from the Web site to the virtual device and having one of a synthesized and a prerecorded voice read the urgent breaking news during the virtual broadcast.

25. The method of claim 6 further comprising the step of providing the user ranking to the source of the conventional broadcast means.

26. The method of claim 25 wherein the user ranking is provided using an Internet connection.

27. The method of claim 9 wherein said step of periodically downloading comprises periodically connecting to the Internet after the step of organizing.

28. The method of claim 9 wherein at least one of the other information comprises items that are streamed across a separate area of the screen than the content during playback of the virtual broadcast.

29. The method of claim 11 further comprising the step of providing the user ranking to the source of the conventional broadcast means.

30. The method of claim 29 wherein the user ranking is provided using an Internet connection.

31. The method of claim 11 wherein said step of capturing a signal comprises capturing, by an antenna on the virtual television broadcast device, a signal generated by a conventional television broadcast.

32. A portable electronic device, comprising:

a digital player configured to playing multimedia content including songs and other information comprising at least one of introductions to the songs, advertisements, weather information, news and videos;

a memory configured to store the multimedia content to be played;

a receiver configured to receive data including the multimedia content, said receiver including an antenna configured to capture radio transmissions;

an input device including buttons associated with functions of said device;

a processor connected with said player, said memory, said receiver, and said input device, said processor including software means configured to generate an automated mixing of songs by processing multiple songs simultaneously and weaving the songs into a virtual broadcast which is played by said digital player;

a display connected to said processor configured to display information relative to said virtual broadcast; and means configured to allow user input of rankings of the songs using said input device during presentation of the songs by said digital player, the user ranking configured to influence the probability of playing the at least one song in the virtual broadcast, said software means further comprising means configured to adjust the virtual broadcast in response to the rankings so that the number of times that at least one song is played within a predetermined time period is adjusted based on the user ranking.

33. The device of claim 13 further comprising a first display for displaying at least one of information related to content being played and menu selections and a second display for displaying video content.

34. The method of claim 1 wherein said step of downloading comprises using a wireless connection and downloading at bulk bandwidth rates.

35. A method for generating a virtual broadcast on a virtual broadcast device, the method comprising:
   connecting the virtual broadcast device to a Web site over a wireless connection, the virtual broadcast device being a mobile phone;
   downloading and storing data comprising content and other information to be integrated into the virtual broadcast from the Web site to the virtual broadcast device in any order, the content comprising songs and the other information comprising at least one of introductions to the songs, advertisements, weather information, and news, wherein the other information includes speech which is recorded in one or more voices including recorded human voices and synthesized speech, the voice to be downloaded being selected by the user; and
   organizing the data on the virtual broadcast device into a particular order for the virtual broadcast according to a selected algorithm provided on the virtual broadcast device after all of the data for the virtual broadcast is downloaded from the Web site, whereby the virtual broadcast device is disconnectable from the Web site during said step of organizing, wherein each of the one or more voices is associated with a different algorithm for performing said step of organizing such that said step of organizing is performed using the algorithm corresponding to the one or more voices selected by the user.

36. The device of claim 23 wherein the localized low power radio transmitters triggers and advertisement defined for that location.

37. The method of claim 1 further comprising the step of discarding dated location of said other information after a period of time.

38. The method of claim 1, wherein said step of adjusting comprises adjusting the organized virtual broadcast so that songs with a higher ranking are played more often than songs with a lower ranking.

39. The method of claim 1, wherein said step of adjusting further comprises replacing lower ranked songs in the virtual broadcast device with new songs.

40. The method of claim 1, further comprising the step of uploading a log of the user's listening history for one of providing demographic information for advertisers and determining distribution of royalties.

41. The device of claim 32 further comprising a second display for displaying video content.

42. The portable electronic device of claim 32, wherein said other information is prerecorded in a simulated voice.

43. The portable electronic device of claim 32, wherein said other information is prerecorded in a plurality of DJ voices, said input device providing means for user selection of one of said plural DJ voices.

44. A portable electronic device, comprising:
   a digital player configured to play multimedia content including songs and other information comprising at least one of introductions to the songs, advertisements, weather information, news and videos, wherein said other information is prerecorded in a plurality of DJ voices;
   a memory configured to store the multimedia content to be played;
   a receiver configured to receive data including the multimedia content, said receiver including an antenna configured to capture radio transmissions;
   an input device including buttons associated with functions of said device, said input device configured to provide means for user selection of one of said plural DJ voices;
   a processor connected with said player, said memory, said receiver, and said input device, said processor including software means configured to generate an automated mixing of songs by processing multiple songs simultaneously and weaving the songs into a virtual broadcast which is played by said digital player, wherein said software means comprises a different algorithm for each of said plural DJs such that the multimedia content is to be played is determined in response to the currently selected one of the plural DJs; and
   a display connected to said processor configured to display information relative to said virtual broadcast.

45. The portable electronic device of claim 32, wherein said means for receiving comprises means for receiving, from local low powered radio transmitters, ads defined for the location of each of the local low powered radio transmitters, said device further comprising means for automatically discarding certain dated information.

46. The portable electronic device of claim 32, wherein said means for adjusting includes means for including higher ranked songs more often than lower ranked songs in the virtual broadcast.

47. The portable electronic device of claim 32, wherein said means for adjusting includes means for replacing lower ranked songs with new songs received by said receiver.

48. The portable electronic device of claim 32, wherein said software means includes means for generating logs of a user's listening history, said logs being uploadable to provide demographic information for use by advertisers and to determine distribution of royalities.

49. The portable electronic device of claim 32, further comprising means for displaying a stream of streaming information separate from said information relative to said virtual broadcast.

50. The portable electronic device of claim 49, wherein the streaming information comprises at least one of news headlines, stock information, and weather reports.

51. The method of claim 1, further comprising the step of establishing a connection to a web site and downloading updated news stories at periodic intervals, incorporating the updated new stories in the virtual broadcast by replacing old stories in the virtual broadcast.

* * * * *

UNITED STATES PATENT AND TRADEMARK OFFICE
CERTIFICATE OF CORRECTION

PATENT NO. : 7,496,947 B1 Page 1 of 1
APPLICATION NO. : 09/513964
DATED : February 24, 2009
INVENTOR(S) : Stephan Meyers It is certified that error appears in the above-identified patent and that said Letters Patent is hereby corrected as shown below:

Column 10, Claim 32, line 43: "playing" should be --play--.

Signed and Sealed this

Twenty-sixth Day of May, 2009

JOHN DOLL
*Acting Director of the United States Patent and Trademark Office*